Patented Oct. 18, 1932

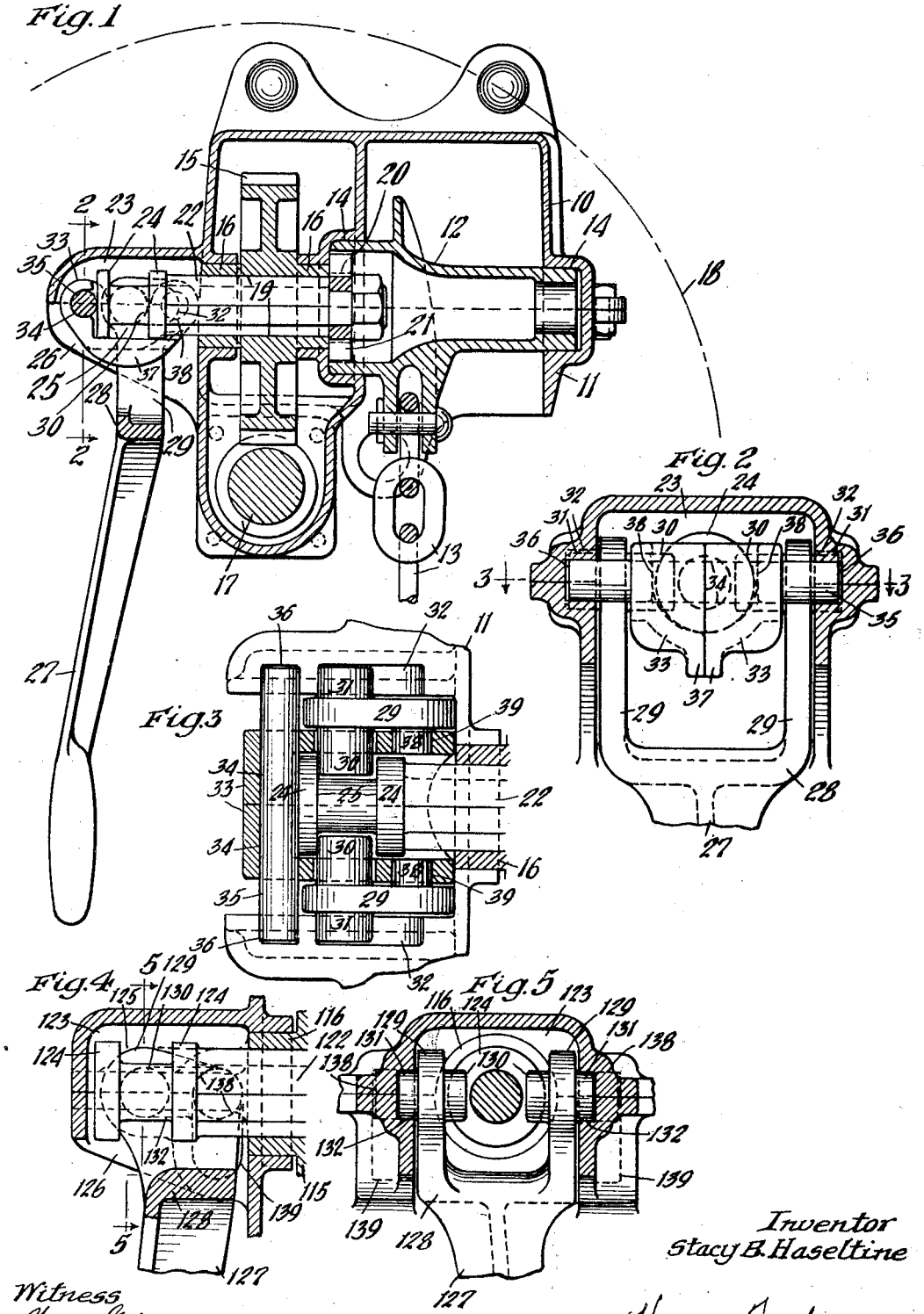

1,882,839

UNITED STATES PATENT OFFICE

STACY B. HASELTINE, OF CHICAGO, ILLINOIS, ASSIGNOR TO W. H. MINER, INC., OF CHICAGO, ILLINOIS, A CORPORATION OF DELAWARE

CLUTCH ACTUATING MEANS

Application filed November 6, 1931. Serial No. 573,361.

This invention relates to improvements in clutch actuating means.

One object of the invention is to provide a simple and efficient manually operated lever means for actuating a clutch member for hand brakes of the worm gear-driven type, to connect and disconnect the chain-winding element and driving gearing of the brakes, wherein the clutch actuating means is held against accidental movement when the clutch is engaged.

A more specific object of the invention is to provide means of the character described in the preceding paragraph, wherein the clutch actuating means is in the form of a gravity-influenced pivoted lever having trunnion means cooperating with the clutch member to shift the same, wherein the pivot of the lever and the trunnion means are brought into horizontal alignment when the lever is in pendent position, thereby locking said lever against accidental movement due to longitudinal thrust imparted by the clutch means.

Other objects of the invention will more clearly appear from the description and claims hereinafter following.

In the drawing, forming a part of this specification, Figure 1 is a vertical sectional view through the housing and operating mechanism of a hand brake, mounted on the end wall of a railway car, said view being in a plane parallel to the end wall, and illustrating my improvements in connection therewith. Figure 2 is a transverse, vertical sectional view, on an enlarged scale, corresponding substantially to the line 2—2 of Figure 1. Figure 3 is a horizontal sectional view, corresponding substantially to the line 3—3 of Figure 2. Figure 4 is a view similar to Figure 1, on an enlarged scale, illustrating another embodiment of the invention, and showing the operating lever, a portion of the clutch member and adjacent parts, including the enclosing end portion of the housing. And Figure 5 is a transverse, vertical sectional view, corresponding substantially to the line 5—5 of Figure 4.

In said drawing, referring first to the embodiment of the invention illustrated in Figures 1, 2, and 3, my improved clutch operating mechanism is shown in connection with a clutch for a hand brake of a railway car. The brake mechanism is mounted within a two-part housing comprising top and bottom sections 10 and 11, which are divided along a horizontal plane. The housing sections 10 and 11 enclose a chain-winding drum 12 having the usual brake chain 13 attached thereto. The opposite ends of the drum are journaled in bearing members 14—14 provided on the housing sections. As shown, the drum is hollow so as to accommodate the clutch member for sliding movement. In axial alignment with the drum, a worm gear 15 is arranged within the housing, having the hub portions 16—16 thereof journaled in bearing members provided on the housing sections. Both the chain-winding drum and the gear 15 are rotatable about a horizontal axis. The gear 15 is driven by a worm member 17 disposed below the same and meshing therewith, the worm member being actuated by the usual hand wheel, which is shown in dotted lines and indicated by 18. The hub portion of the worm gear 15 is provided with an axial opening 19 of angular cross-section. The chain-winding drum 12, as shown in Figure 1, is enlarged at the left-hand end, said end portion being provided with internal clutch projections 20—20. A clutch head 21 having cooperating clutch projections engages the projections 20—20 and is mounted on the right-hand end portion of a sliding clutch member 22 supported within the opening of the worm wheel 15. The portion on which the clutch head 21 is mounted is of angular cross-section so that the clutch head 21 will rotate with the member 22. The shank of the clutch member 22 projects to the left outwardly beyond the hub portion 16 of the worm wheel 15, as clearly shown in Figure 1, said section being housed within a chamber 23 of the housing. The projecting end portion of the shank of the clutch member 22 is provided with a pair of spaced annular flanges 24—24 defining an annular guide groove 25 therebetween.

The housing section is open at the bottom, as indicated at 26, to accommodate the operating lever 27 for swinging movement. The operating lever is forked at the inner end, as indicated at 28, said fork being formed by spaced side arms 29—29. The side arms 29—29 are provided with inner and outer pairs of axially aligned trunnions 30—30 and 31—31. The trunnions 31—31 are guided in horizontal guide slots 32—32 provided in the side walls of the housing chamber 23, said guide slots being formed partly in each of the sections 10 and 11 of the housing.

A link member 33 is disposed between the arms 29—29 of the forked section 28 of the lever 27, said link being formed of two similar sections. At the left-hand end, the link is provided with an opening 34 therethrough accommodating a pivot pin 35 having its opposite ends seated in bearing openings 36—36 provided in the side walls of the housing chamber 23. Between the ends, the link is downwardly offset, as indicated at 37, so as to clear the trunnions 30—30 of the forked portion of the lever 27. The trunnions 30—30 engage within the annular guide groove 25 of the stem of the clutch member 22. As most clearly shown in Figure 3, the arms 29—29 of the fork 28 of the lever 27 extend to the right of the trunnion members 30 and 31, said extended portions being provided with aligned interior, inwardly projecting cylindrical bosses or trunnions 38—38, which engage within bearing openings 39—39 provided in the corresponding ends of the sections of the link 33.

In Figures 1, 2, and 3, the clutch operating lever 27 is shown in pendent position with the clutch head 21 of the clutch member 22 in driving engagement with the clutch projections of the chain-winding drum 12. As will be evident, with the parts in this position, the chain-winding drum will be rotated upon actuation of the hand wheel 18 through the driving engagement of the worm 17 and worm gear 15. In this position, the axes of the pivot pin 35 and the trunnions 30—30, 31—31, and 38—38 are in horizontal alignment, whereby any thrust in an axial direction of the clutch member will be resisted, thus maintaining the operating lever in the pendent position shown in Figure 1 and preventing accidental disengagement of the clutch means. To disengage the clutch and permit rotation of the chain-winding drum 12 with respect to the worm gear 15 so as to effect release of the brakes, the lever 27 is swung to the left and upwardly, as viewed in Figure 1, thereby causing the same to swing on the trunnions 31—31 and on the link 33 through the swiveled connection with the link provided by the trunnions or bosses 38—38. As the link is pivoted on the pin 35, the link will swing about this pin, thereby controlling the movement of the trunnions 38—38 of the lever 27 about the axes of the trunnions 31—31. As the trunnions 31—31 are confined to horizontal movement by the guideways 32—32, the trunnions will travel to the right in said guideways, as viewed in Figure 3. The movement of the trunnions 30—30 will necessarily be in the same path as the trunnions 31—31, thereby sliding the clutch member 22 to the right, as viewed in Figure 1, through engagement of the trunnions 30—30 with the annular groove 25 of the clutch member. Disengagement of the clutch head 21 will thus be effected, thereby permitting rotation of the drum 12 and unwinding of the chain. To re-engage the clutch member 22 with the drum 12, the same is shifted to the left, as viewed in Figure 1, by bringing the lever 27 back to the pendent position shown in Figure 1. This downward swinging movement of the lever will cause the trunnions 31—31 of the forked section of the lever to travel to the left in the slots or guideways 32—32 of the housing and cause the trunnions 30—30 on the inner side of the forked section 28 of the lever to shift the clutch member 22 to the left also, thereby engaging the clutch head 21 with the clutch projections 20 of the chain-winding drum.

Referring next to the embodiment of the invention illustrated in Figures 4 and 5, the arrangement of the parts of the brake mechanism is substantially the same as that described in connection with Figures 1, 2, and 3. In Figures 4 and 5, the clutch member is indicated by 122, the same being in all respects similar to the clutch member 22 hereinbefore described and having a clutch head, not shown, which engages with clutch means on the chain-winding drum. The shank of the clutch member 122 is of angular cross-section and slidingly fits within the opening of the hub section 116 of the worm gear 115. The worm gear 115 is in all respects similar to the gear 15 hereinbefore described and operates in the same manner. The shank of the clutch member 122 extends outwardly beyond the hub section of the worm wheel 115, said extending portion being disposed within the chamber 123 of the housing of the brake mechanism. The chamber 123 is open at the bottom, as indicated at 126, so as to accommodate the lever 127 for swinging movement. The upper end of the lever only is shown in Figures 4 and 5. This lever, however, corresponds to the lever 27 hereinbefore described. At the upper end, the lever 127 is forked, as indicated at 128, the forked portion being formed by spaced arms 129—129. The arms 129—129 are provided with axially aligned pairs of interior and exterior trunnions 130—130 and 131—131. The interior trunnions 130—130 engage within a guide groove 125 provided between spaced annular flanges 124—124 on the outer end of the shank of the clutch member 122. The trunnions 131—131 are guided in horizontally disposed guideways 132—132 provided on the side walls of the chamber 123 of the housing. The arm members 129—129 of the forked section 128 of the lever 127 are extended to the right, as clearly shown in Figure 4, and said extended portions are provided with cylindrical lugs or trunnions 138—138 on the outer sides thereof which are guided in vertical guideways 139—139 provided in the opposite side walls of the chamber 123 of the housing.

In Figures 4 and 5, the position of the parts shown is that wherein the clutch member is in operative engagement so as to connect the chain-winding drum to the worm gearing of the hand brake mechanism. As clearly shown in Figure 4, the trunnions 130—130, 131—131, and 138—138 are so disposed that the axes thereof are in horizontal alignment, thereby holding the operating lever 127 against swinging movement through axial thrust imparted by the clutch member 122, thus preventing accidental disengagement of the clutch. In order to disengage the clutch, the same is moved to the right, as viewed in Figure 4. To effect this movement, the lever 127 is swung to the left and upwardly, as viewed in Figure 4, thereby causing the trunnions 138—138 to travel downwardly in the vertical guideways 139—139 and the trunnions 131—131 to travel to the right, as viewed in Figure 4, in the horizontal guideways 132—132. Movement of the trunnions 130—130 which engage within the annular groove 125 of the clutch member 122 will thus be controlled and the clutch shifted to the right, as viewed in Figure 4. To re-engage the clutch, the lever 127 is dropped to the pendent position shown in Figure 4, thus again bringing the trunnions to the holding position hereinbefore described.

I have herein shown and described what I now consider the preferred manner of carrying out my invention, but the same is merely illustrative and I contemplate all changes and modifications that come within the scope of the claims appended hereto.

I claim:

1. In a clutch operating mechanism, the combination with a rotary clutch member; of a cooperating rotary clutch element, said element being axially shiftable toward the clutch member to engage the same therewith; and a swiveled lever for shifting said clutch element, said lever having trunnion means swiveled to said clutch element, the axis of said trunnion means being brought into alignment with the center of swiveling movement of the lever in a plane parallel to the axis of said shiftable element when said clutch element is in operative engagement with the clutch member.

2. In a clutch operating mechanism, the combination with a rotary clutch member; of a cooperating rotary clutch element, said element being axially shiftable toward the clutch member to engage the same therewith; a lever having a pivot member; trunnion means swiveled to said clutch element, said pivot member of the lever being slidably guided in a path parallel to the axis of said clutch element; and means controlling the movement of said pivot member during swiveling movement of the lever.

3. In a clutch operating mechanism, the combination with a clutch member; of a cooperating rotary clutch element, said member and element being rotatable about a common horizontal axis, and said element being axially slidable to engage the same with and disengage the same from said member; and a lever for shifting said clutch element, said lever having a swiveled connection with said clutch element, and having pivot means on which it is movable, said pivot means being guided for horizontal movement and being in horizontal alignment with the axis of turning movement of said swiveled means when the clutch element is engaged with the clutch member and the lever is in pendent position.

4. In a clutch operating mechanism, the combination with a clutch member; of a cooperating rotary clutch element, said member and element being rotatable about a common horizontal axis, and said element being axially slidable to engage the same with and disengage the same from said member; a lever for shifting said clutch element, said lever having a swiveled connection with said clutch element, and having pivot means on which it is movable, said pivot means being guided for horizontal movement; and a link pivoted to a fixed support for swinging movement about a horizontal axis, said link being pivoted to said lever at a point eccentric to said pivot means, said pivot means, swiveled means, pivot of the link, and pivoted connection of the link with the lever being in horizontal alignment when said clutch element is in engagement with the clutch member and the lever is in pendent position.

5. In a clutch operating mechanism, the combination with a clutch member; of a clutch element, said member and element being rotatable about a common horizontal axis, and said element being axially slidable to engage the same with and disengage the same from said member; supporting means; a lever; trunnion means on the lever engaged with said element; additional trunnion means on the lever; guide means on said support receiving the last named trunnion means and guiding the same in a horizontal path; and means connected to said support for controlling the movement of said additional trunnion means during swinging movement of said lever.

6. In a clutch operating mechanism, the combination with a clutch member; of a clutch element, said member and element being rotatable about a common horizontal axis, and said element being axially slidable to engage the same with and disengage the same from said member; supporting means; a lever; trunnion means on the lever engaged with said element; additional trunnion means on the lever; guide means on said support receiving the last named trunnion means and guiding the same in a horizontal path; and a link pivoted at one end to said support and at the other end to said lever, said connection with the lever being at a point offset with respect to said trunnion means for controlling the movement of said additional trunnion means during swinging movement of the lever.

7. In a clutch operating mechanism, the combination with a clutch member; of a clutch element, said member and element being rotatable about a common horizontal axis, and said element being axially slidable to engage the same with and disengage the same from said member; supporting means having horizontally disposed guideways; a lever; trunnion means on the lever having a swiveled connection with said clutch element; additional trunnion means in axial alignment with said first named trunnion means and slidably engaged in said horizontal guideways; and a link member pivoted to said support at one side of the common axis of said trunnion means and pivoted to said lever at the opposite side of said trunnion means.

8. In a clutch operating mechanism, the combination with a clutch member; of a clutch element, said member and element being rotatable about a common horizontal axis and said element being axially slidable to engage the same with and disengage the same from said clutch member, said element having an annular guide groove thereon; supporting means having horizontally disposed guideways; a lever; a pair of trunnion members on said lever engaged within said guide groove; an additional pair of trunnions on said lever in axial alignment with said first named trunnions, said additional trunnions being engaged within said horizontal guideways; and a link pivoted at one end to said lever at a point offset from said trunnions, said link having the other end pivotally connected to said supporting means at a point at the other side of said trunnions.

9. In a clutch operating mechanism, the combination with a clutch member; of a clutch element, said member and element being rotatable about a common horizontal axis, and said element being axially slidable to engage the same with and disengage the same from said member; supporting means; a lever; trunnion means on the lever engaged with said element; additional trunnion means on the lever; guide means on said support receiving the last named trunnion means and guiding the same in a horizontal path; guide lugs on said lever offset from said trunnions; and guide means on said supporting means in which said lugs are vertically slidable.

10. In a clutch operating mechanism, the combination with a clutch member; of a clutch element, said member and element being rotatable about a common horizontal axis, and said element being axially slidable to engage the same with and disengage the same from said member; supporting means having horizontally disposed guideways; a lever; trunnion means on the lever having a swiveled connection with said clutch element; additional trunnion means in axial alignment with said first named trunnion means and slidably engaged in said horizontal guideways; vertical guideways on said supporting means; and guide trunnions on said lever offset from said first named trunnions and engaging within said vertical guideways.

11. In a clutch operating mechanism, the combination with a clutch member; of a clutch element, said member and element being rotatable about a common horizontal axis, and said element being axially slidable to engage the same with and disengage the same from said clutch member, said element having a shank provided with an annular guide groove; a lever having a forked section embracing said shank, said forked section of the lever being provided with interior and exterior coaxial trunnions, said interior trunnions engaging within said guide groove; a support having horizontal and vertical guideways, said exterior trunnions of the forked portion of the lever engaging within said horizontal guideways; and cylindrical lugs on said lever eccentric to said trunnions and slidably engaged within said vertical guideways of the support.

In witness that I claim the foregoing I have hereunto subscribed my name this 4th day of November, 1931.

STACY B. HASELTINE.